United States Patent
Origuchi et al.

[11] Patent Number: 5,977,242
[45] Date of Patent: Nov. 2, 1999

[54] TWO-PART EMULSION ADHESIVE

[75] Inventors: Toshiki Origuchi; Yukiharu Hayashi, both of Osaka, Japan

[73] Assignee: Konishi Co., Ltd., Osaka, Japan

[21] Appl. No.: 08/757,847

[22] Filed: Nov. 27, 1996

Related U.S. Application Data

[63] Continuation-in-part of application No. 08/391,257, Feb. 17, 1995, abandoned, which is a continuation of application No. 08/157,381, Nov. 23, 1993, abandoned.

[30] Foreign Application Priority Data

| Nov. 24, 1992 | [JP] | Japan | 4-313077 |
| Mar. 11, 1993 | [JP] | Japan | 5-50809 |
| Mar. 18, 1993 | [JP] | Japan | 5-58260 |

[51] Int. Cl.$^6$ ........................ C08L 33/08
[52] U.S. Cl. ............... 524/521; 524/516; 524/555; 524/564
[58] Field of Search ............... 524/521, 516, 524/564, 555

[56] References Cited

U.S. PATENT DOCUMENTS

| 3,634,372 | 1/1972 | McFadden | 525/329.9 |
| 4,386,992 | 6/1983 | Takegawa et al. | 156/327 |
| 4,431,757 | 2/1984 | Okitsu et al. | 524/25 |

FOREIGN PATENT DOCUMENTS

| A-2947818 | 11/1980 | Germany . |
| A-55-149363 | 11/1980 | Japan . |
| A-56-90867 | 7/1981 | Japan . |
| A-60-202176 | 10/1985 | Japan . |
| A-61-21171 | 1/1986 | Japan . |
| A-61-78883 | 4/1986 | Japan . |

OTHER PUBLICATIONS

European Search Report, Mar. 18, 1994.

*Primary Examiner*—Marion McCamish
*Assistant Examiner*—John J. Guarriello
*Attorney, Agent, or Firm*—Blank Rome Csmisky & McCauley LLP

[57] ABSTRACT

Disclosed is a two-part adhesive comprising: (A) an aqueous emulsion liquid having a polymer component and an emulsifier component, in which at least one of the polymer component and the emulsifier component contains an anion radical; and (B) a solution having an amino-radical-containing acrylic copolymer. The amount of the polymer component in the aqueous emulsion liquid is within a range of from about 20% to about 80% by weight. When the aqueous emulsion liquid (A) contacts the solution (B) on an adherend surface, they form sticky gel adhesive.

26 Claims, No Drawings

TWO-PART EMULSION ADHESIVE

BACKGROUND OF THE INVENTION

This application is a continuation in part application from U.S. patent application Ser. No. 08/391,257 filed on Feb. 17, 1995, which is now abandoned and herein incorporated by reference and which is a continuation application from U.S. patent application Ser. No. 08/157,381 filed on Nov. 23, 1993, which had been abandoned.

FIELD OF THE INVENTION

The present invention relates to a two a two-part type adhesive, and in particular to a two-part type emulsion adhesive which can be suitably applied for adhesion of rough adhered surfaces such as those of polyurethane foam.

DESCRIPTION OF THE PRIOR ART

Conventionally, chloroprene adhesives and other rubber adhesives, in which a rubber adhesive component is dissolved in an organic solvent, have been widely used. However, the organic solvent used for these rubber adhesives give rise to the dangers of inflammability and toxicity, and cause a host of other problems including environmental pollution, etc. Therefore, in recent years, if adherends have a permeability to water or steam, water emulsion type adhesives have been generally employed in place of the rubber adhesives.

However, the initial bond strength of the water emulsion type adhesive develops slowly in comparison with the rubber adhesives, and a great deal of time is required for obtaining sufficient adhesive strength from the water emulsion type adhesive. More specifically stated, if a rubber adhesive is used, the adherends can be bonded to each other simply by pressing them together after applying the adhesive. In contrast, if a conventional water emulsion type adhesive is used, the emulsion micelles form an adhesive layer at quite a low speed due to poor evaporation of the water solvent, thus requiring a relatively longer time for bonding to be completed. Moreover, if the adherend is a foam body such as urethane foam and the like, the adhesive emulsion penetrates the foam bodies through the pores, resulting in unsatisfactory adhesion strengths for the water emulsion adhesive. This is highly disadvantageous when put to practical use.

To solve the above problem, an improved process was proposed, in which the emulsion adhesive applied to the adherend is heated to evaporate the water and dry the adhesive layer formed before joining the adherends to each other. However, a sufficient initial bond strength does not develop even with this process. Furthermore, this process is disadvantageous because of the additional requirement for a drying device.

On the other hand, Japanese Patent Publication Nos. S63-17871, H1-60190, H1-60191 and H1-60192 show a few methods in which an aqueous emulsion type adhesive is gelled. In each of these methods, the emulsion type adhesive is applied on one adherend, while an agent for gelling the emulsion is dispensed on the other adherend. Then, when the emulsion adhesive contacts with the gelation agent, it is gelled to adhere the adherends to each other. With these methods, the initial bond strength of the adhesives can be improved, but the problem that the adhesive penetrates the foam material cannot be solved by those methods. Moreover, since the gelation and hardening of the emulsion brought about by these proposed methods are quite rapid, wettability of the adhesive to the adherend surfaces quickly deteriorates. Therefore, these methods are not suitable for bonding adherends having rough surfaces, such as urethane foam, glass wool materials and the like.

Japanese Patent Publication No. S60-26434 discloses another gelling method, in which an aqueous emulsion type adhesive and a gelling liquid containing a gelling agent are sprayed onto the adherend at the same time, so that the sprayed emulsion adhesive and gelling liquid become mixed as they are blown onto the adherend. However, the sprayed mixture of this method also gels and hardens too rapidly, and the wettability is poor. Therefore, this method cannot replace conventional rubber adhesives using organic solvents.

SUMMARY OF THE INVENTION

In order to solve the above-mentioned problems, it is an object of the present invention to provide an aqueous adhesive in which initial bond strength rapidly increases, and which can easily bond adherends having rough surfaces.

The foregoing object is accomplished in one embodiment of the present invention by providing a two-part adhesive comprising: (A) an aqueous emulsion liquid having a polymer component and an emulsifier component, in which at least one of the polymer component and the emulsifier component contains an anion radical and the amount of the polymer component in the aqueous emulsion liquid is within a range of from about 20% to about 80% by weight; and (B) a solution having an amino-radical-containing acrylic copolymer, wherein in combination said aqueous emulsion liquid (A) and said solution (B) form a sticky gel adhesive.

In accordance with the above-mentioned construction, the two-part adhesive provides sufficient initial bond strength when bonding hydrophobic plastics and foam materials with rough surfaces, such as urethane foam and the like.

The objects and features of the present invention may be understood with reference to the following detailed description of the embodiments of the present invention.

DETAILED DESCRIPTION OF THE PREFERRED EMBODIMENTS

Now, preferred embodiments of the two-part emulsion adhesive according to the present invention will be described in detail.

In gelation of conventional two-part emulsion adhesives, a substance such as metal ions and the like that destablizes the emulsion by entering it and breaking down the emulsion micelles, whereby the emulsion liquid is gelled and hardened. According to the above gelation process, the inventors conducted research and found that conventional two-part type emulsion adhesives give rise to quick gelation and hardening, and wetting ability of the gelled adhesive deteriorates in accordance with quick gelation. Moreover, it was also found that water molecules are rapidly discharged out of the gelled adhesive component. According to this fact, the inventors considered that the gelled adhesive becomes separated from the adherend surface by the discharged water, thereby preventing a sufficient initial bond strength from developing.

In contrast with the above-mentioned discoveries, the two-part type emulsion adhesive according to the present invention is gelled and hardened at an appropriate speed, and the gelled adhesive becomes very sticky and tacky like birdlime. From these facts, the inventors believe the mechanism of the gelling phenomenon caused by the emulsion adhesive of the present invention to be in every way different from those of conventional two-part type emulsion adhesives. Namely, in the present invention, the gelled adhesive has suitable wetting capabilities and exhibits satisfactory tackiness due to appropriate gelation speeds and specific physical properties of the gelled adhesive. According to these characteristics, the two-part type emulsion adhesive of the present invention can also be suitably used for adhesion of foam materials such as urethane foam and adherends having rough surfaces.

The mechanism of the gelation according to the present invention has not yet been fully understood, but it appears to be related to not only destabilization of the emulsion micelles but also insolubilization in the gelling liquid (B). Specifically, it seems possible to obtain a gelled adhesive having high tackiness if the gelling liquid (B) is insolubilized when the gelling liquid (B) contacts the emulsion liquid (A). Now, construction of the two-part type emulsion adhesive having the above-mentioned features according to the present invention will be described below.

For the two-part type emulsion adhesive according to the present invention comprising an emulsion liquid (A) and a gelling liquid (B), the emulsion liquid (A) includes an aqueous emulsion in which the emulsion micelles contain a polymer component and an anion radical component. The emulsion liquid (A) described above can be prepared by emulsifying a polymer compound containing an anion radical in itself, or by emulsifying a polymer compound with an emulsifier agent containing an anion radical. In other words, the anion radical can be introduced by incorporating the anion radical either into the polymer component or the emulsifying agent.

Examples of anion radicals include a carboxyl radical, a sulfo radical, a hydroxysulfonyloxy radical [—OSO$_2$(OH)], a dihydroxy phosphoryloxy radical [—OPO(OH)$_2$] and derivatives, and various salts of the above anion radicals.

In the case of employing an anion-radical-containing polymer compound as the component for introducing the anion radical, a monopolymer of an anion-radical-containing unsaturated monomer, a copolymer of anion-radical-containing unsaturated monomers, and a copolymer of an anion-radical-containing unsaturated monomer and a copolymerizable unsaturated monomer can be utilized. The copolymer may be prepared from three or more kinds of monomer. Alternatively, it is also possible to introduce the anion radical to terminal ends of the polymer compound by using a polymerization catalyst. For example, if potassium persulfate, ammonium persulfate or the like is used as a polymerization initiator, a hydroxysulfonyloxy radical is introduced to the terminal end of the polymer. However, it is rather difficult to sufficiently introduce the anion radical by using only polymerization initiator so as to suitably form sticky gel adhesive. Therefore, it is preferred to use an anion-radical-containing monomer for sufficient introduction of the anion radical, which is described below.

In the above case, an unsaturated monomer having a carboxyl radical or a sulfo radical, in general, can be easily used as an anion-radical-containing unsaturated monomer. Examples of an unsaturated monomer having a carboxyl radical include unsaturated carboxylic acids such as acrylic acid, methacrylic acid, itaconic acid, maleic acid, fumaric acid and the like. For the unsaturated monomer having a sulfo radical, examples include styrenesulfonic acids, allylsulfonic acid, sulfopropyl acrylates, 2-methacryloyloxynaphtalene-2-sulfonic acid, 2-acryloyloxybenzenesulfonic acid and the like. Of course, each of the carboxyl radical and the sulfo radical of the above-illustrated monomers may be used in the form of a salt neutralized by a base compound.

In the case of employing an anion-radical-containing copolymer, any known ethenoid monomer that can be copolymerized with the anion-radical-containing monomer can be used for the comonomer to be copolymerized to the anion-radical-containing monomer. Typical examples for the comonomer includes acrylate ester monomers such as methyl acrylate, ethyl acrylate, propyl acrylate, butyl acrylate, hexyl acrylate, 2-ethylhexyl acrylate, octyl acrylate, isooctyl acrylate, lauryl acrylate, stearyl acrylate and the like; methacrylate ester monomers such as methyl methacrylate, ethyl methacrylate, propyl methacrylate, butyl methacrylate, hexyl methacrylate, 2-ethylhexyl methacrylate, octyl methacrylate, isooctyl methacrylate, lauryl methacrylate, stearyl methacrylate and the like; aromatic unsaturated monomers such as styrene, vinyltoluene, α-methylstyrene, N-vinyl-2-pyrrolidone, 2-vinylpyridine and the like; olefinic monomers such as ethylene, propylene, butylene, isobutylene, pentene and the like; diene monomers such as butadiene, isoprene, chloroprene and the like; vinyl ester monomers such as vinyl acetate, vinyl propionate and the like; and nitrile monomers such as acrylonitrile, methacrylonitrile and the like. Moreover, another monomers such as hydroxyalkyl acrylate monomers, hydroxyalkyl methacrylate monomers, methoxymethyl acrylate, ethoxymethyl acrylate, glycidyl acrylate, glycidyl methacrylate, acrylamide, methacrylamide, N-methylolacrylamide, N-(methoxymethyl)acrylamide, N-(ethoxybuthyl) acrylamide and the like can be utilized as well. In particular, when an epoxy-radical-containing monomer such as glycidyl acrylate, glycidyl methacrylate and the like is used as a comonomer to prepare the anion-radical-containing copolymer for the emulsion liquid(A), the epoxy radical connects to the amine radical contained in the gelling liquid (B) to crosslink the polymer component of the emulsion liquid (A) with that of the gelling liquid (B), thereby improving the adhesive strength, heat resistance and water resistance of the gelled adhesive.

The monomer as illustrated above can be formed into the aqueous emulsion liquid (A) of the anion-radical-containing polymer compound by emulsion polymerization of the monomer with an ordinary nonionic or anionic surfactant. The surfactant is preferably used at an amount of 0.1 to 20% by weight relative to the total amount of monomer component to be polymerized, in accordance with a general manner of emulsion polymerization. The emulsion polymerization reaction is generally performed by heating the monomer emulsion liquid at a temperature of about 40 to 90° C. for about 1.5 to 8 hours. In the case of preparing copolymer from a mixture of monomers, it is preferable to blend the anion-radical-containing unsaturated monomer at a ratio of about 0.05 to 90% by weight, preferably about 0.1 to 50% by weight relative to the total amount of monomers. Alternatively, a water-soluble polymer such as polyvinyl alcohol and the like can be employed as an emulsifier for emulsion polymerization, in stead of the surfactant described above. In accordance with the above-described combination of monomers, various copolymers can be obtained. Of the those copolymers, an acrylic copolymer, a styrene-butadiene copolymer and a chloroprene copolymer are suitable, and especially, an acrylic copolymer is more suitable.

Here, it is noted that in the present invention, "acrylic copolymer" is defined as meaning a copolymer which is obtained by copolymerizing a monomer mixture containing at least one selected from acrylate esters and methacrylate esters (acrylate esters and methacrylate esters are generically called "acrylic esters" hereafter), and that it may include copolymers of an acrylic ester monomer and a non-acrylic monomer such as styrene, vinyl acetate, ethylene and the like.

In the case of using an anion-radical-containing emulsifier (i.e., an anionic surfactant) for the anion radical component, any known anion surfactants can be widely utilized in the present invention. Examples include various salts of fatty acids, salts of monoalkyl hydrogen sulfates, salts of phosphoric acid, salts of alkyl sulfonic acids, salts of alkylbenzenesulfonic acids, salts of alkylnaphthalenesulfonic acids, salts of dialkyl hydrogen sulfosuccinates, salts of alkyldiphenyletherdisulfonic acids, salts of alkyl dihydrogen phosphates, salts of dialkyl hydrogen phosphates, salts of (polyoxyethylene alkyl ether)sulfonic acids and salts of (polyoxyethylene alkylphenyl ether)sulfonic acid.

Another type of anionic surfactant, a reactive anionic surfactant which has a double bond in its molecule can also be used as an anionic surfactant. Examples of the reactive anionic surfactant includes ADEKAREASOAP series (trade name) sold by ASAHI DENKA KOGYO K.K. of Chuo-ku, Tokyo, Japan and AQUALON series (trade name) sold by DAI-ICHI KOGYO SEIYAKU CO., LTD. of Shimogyo-ku, Kyoto, Japan. If the reactive anion surfactant is utilized, the surfactant itself also reacts during emulsion polymerization. Therefore, the surfactant can play a role of polymer as well. Alternatively, an anion-radical-containing water-soluble polymer such as sulfo- or carboxyl-substituted polyvinyl alcohol and the like can be used as an emulsifier, instead of the surfactant. In this case, the emulsifier can also similarly work as a polymer component.

The polymer compound in the above case may contain no anion radical. Therefore, any monopolymer and copolymer prepared from either an anion-radical-containing unsaturated monomer, other unsaturated monomers or mixture thereof can be utilized, as can be understood from the above description. Of course, the copolymer may be prepared from three or more kinds of monomer. Of the above-mentioned polymers, an acrylic copolymer, a styrene-butadiene copolymer and a chloroprene polymer are especially suitable, and, especially, an acrylic copolymer is desired. For preparation of these polymers, an emulsion polymerization method is ordinarily employed with the use of an anionic surfactant. Therefore, after the emulsion polymerization of the monomer has been carried out with the above-mentioned anionic surfactant being used as an emulsifier, the obtained reaction liquid containing the anionic surfactant can be directly utilized for the emulsion liquid (A), according to the present invention. Of course, another portion of the anionic surfactant may be added to the liquid after the polymerization reaction. When the anionic surfactant is employed for introducing the anion radical component, the amount of anionic surfactant in the emulsion liquid (A) is not strictly limited. However, if the amount of the surfactant is less than 0.1% by weight relative to the amount of the polymer component, it becomes difficult to form an appropriate gel in a birdlime-like condition, and if the amount of the surfactant exceeds 30% by weight, adhesion, wetting ability and water resistance of the gelled adhesive tend to deteriorate. Therefore, the content of the surfactant is preferably set to a value of 0.1 to 30% by weight, and more preferably 0.5 to 15% by weight, relative to the amount of the polymer component.

As can be understood from the above description, the aqueous emulsion liquid (A) contains a resin component (i.e., the polymer compounds illustrated above) that imparts adhesive properties. The amount of the resin component is not severely restricted. However, in general if the amount of the resin component is insufficient, it becomes difficult to form a satisfactory layer of the gelled adhesive on the adherend surface, so that initial adhesion may not be sufficient imparted to the gel. On the other hand, if the resin component is excessive, the application of the emulsion liquid (A) becomes difficult. In view of these points, the amount of the polymer component in the present invention is preferably set at a value within a range of about 20 to 80% by weight, and more preferably, 40 to 70% by weight.

Moreover, if the aqueous emulsion liquid (A) contains an epoxy resin intermolecularly having two or more epoxy radicals, the epoxy resin reacts with the amino radical of the component of the gelling liquid (B) to crosslink with each other. In accordance with this, the adhesive strength, heat resistance, water resistance and the like of the gelled adhesive can be improved. As the epoxy resin, various epoxy resins intermolecularly having two or more epoxy radicals can be widely used, and example of the epoxy resin includes bifunctional epoxy resins including bisphenol A epoxy resins such as bisphenol A diglycidyl ether, bisphenol F epoxy resins such as bisphenol F diglycidyl ether, bisphenol S diglycidyl ether, resorcinol diglycidyl ether, hexahydro-bisphenol A diglycidyl ether, polypropylene glycol diglycidyl ether, neopentyl glycol diglycidyl ether, diglycidyl phthalate, glycidyl oxybenzoate glycidyl ether, diglycidyl ester and the like; and multifunctional epoxy resins such as triglycidyl isocianurate, N-polyglycidyl-di(aminophenyl) methane type epoxy resins, tetraglycidyl methaxylenediamine, novolak epoxy resins such as cresol novolak polyglycidyl ether and the like. A plural kinds of expoxy resins may be employed for the present invention.

The aqueous emulsion liquid (A) according to the present invention may further contain a tackifier such as rosin ester, petroleum resin, terpene resin and the like, and a filler such as calcium carbonate, clay and the like, as occasion arises.

For the solvent of the aqueous emulsion liquid (A), water and aqueous mixtures can be utilized. In particular, aqueous mixtures containing glycol ether is preferred to obtain a gel having a stickiness.

In the present invention, the gelling liquid (B) is a solution containing a gelling agent and characterized in that the gelling agent includes an acrylic copolymer which contains an amino radical intermolecularly. The gelling liquid (B) causes insolubilization when the gelling liquid (B) contacts the emulsion liquid (A) to cause gelation, and, if the gelling liquid (B) appropriately gives rise to insolubilization, the gelled adhesive becomes sticky and tacky like birdlime. On the other hand, an amino radical of the gelling agent imparts hydrophilicity to the gelling agent molecule. Therefore, the ratio of the amino radical contained in the gelling agent molecule is a factor which affects insolubilization of the gelling liquid (B). A preferred amount of the amino radical in the gelling agent molecule may rather changes in accordance with the form of amino radical, namely, which of primary, secondary and tertiary amines the amino radical is. However, in general, the gelling agent molecule is preferred to contain the amino radical at a ratio of $2 \times 10^{-4}$ to $60 \times 10^{-4}$ mol/g, more preferably, $5 \times 10^{-4}$ to $40 \times 10^{-4}$ mol/g. The amino radical content in the polymer can be obtained by calculating it from a blended ratio of raw materials, or by measuring the amount of nitrogen or hydrogen atoms of amino radical with various known methods. For example, the amino radical content can be calculated by using a value of amine hydrogen equivalent weight which can be measured in accordance with a conventional colloid titration method with use of a potassium polyvinyl sulfate standard solution. Alternatively, the amino radical content may be determined by measurement of amino equivalent weight, etc., referring to U.S. Pat. No. 3,634,372.

The amino radical may be contained in any form of primary amine, secondary amine and tertiary amine, but does not include imino radical, amido radical or imide radical. In other words, the "amino radical" of the present invention literally means "amino radical". Of course, amino radicals in the form of an amine salt with an acid substance is also applicable. For the acrylic copolymer section of the gelling agent molecule, various structures of copolymers which have been generally known as acrylic copolymers are applicable. However, which of the primary, secondary and tertiary amine forms the amino radical has is varied in accordance with the process through which the gelling agent containing an amino radical is prepared. The gelling agent, or acrylic copolymers containing an amino radical will be described in detail below.

An acrylic copolymer containing the amino radical in the form of a primary amine at its molecule end can be prepared, for example, by reacting an acrylic copolymer having a carboxyl radical with an alkylene imine. In this case, the product (hereafter, referred to as "acrylic amino polymer") has a main polymer chain having an acrylic copolymer structure and a side chain having aminoalkyl structure in which the terminal end is in the form of a primary amine, as illustrated by the following formula (1), wherein n represents a repeating unit number. As can be understood from the formula, if the number n equals 1, the side chain has only an amino radical (non-substituted amino radical=primary amine), and if the number n is greater than or equal to 2, the side chain contains both the primary amine and at least one secondary amine, with the primary amine being located only at the terminal end. If the acrylic amino polymer is neutralized with an acid, the amino radicals are converted to amine salts.

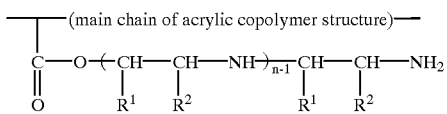

(1)

wherein each of $R^1$ and $R^2$ is, respectively, a hydrogen atom or an alkyl radical containing 1 to 3 carbon atoms, and the number n is a repeating unit number of 1 to 4.

The acrylic copolymer having a carboxyl radical used in preparing the acrylic amino polymer can be obtained by carrying out a solution polymerization reaction on a mixture of 1 to 50% by weight of a carboxyl-radical-containing unsaturated monomer and 50 to 99% by weight of a comonomer in an appropriate organic solvent. For the comonomer, it is desired to use an acrylic ester monomer (i.e., acrylate ester or methacrylate ester). The comonomer may be a mixture of several kinds of unsaturated monomers, if the mixture contains the acrylic ester as a main component. For that unsaturated monomer, any unsaturated monomer that can be copolymerized with the carboxyl-radical-containing unsaturated monomer can be used. The solution polymerization reaction proceeds by heating the reactant solution in the presence of an initiator at a temperature of about 60 to 100° C. for about four to twenty-four hours. The obtained carboxyl-radical-containing acrylic copolymer is then treated with the alkylene imine compound to react the carboxyl radical of the acrylic copolymer with the alkylene imine, thereby preparing the acrylic amino polymer. The reaction with the alkylene imine compound can be achieved, for example, by stirring the carboxyl-radical-containing copolymer and the alkylene imine at a temperature of approximately 40 to 150° C.

For the carboxyl-radical-containing unsaturated monomer, examples include carboxylic acid compounds such as acrylic acid, methacrylic acid, crotonic acid, maleic acid, itaconic acid; and anhydride compounds such as maleic anhydride, itaconic anhydride and the like. Of these compounds, acrylic acid and methacrylic acid are especially preferable. On the other hand, the comonomer is desired to contain at least 50% or more by weight of an acrylic ester monomer. Specific examples of the acrylic ester monomer are acrylate esters such as methyl acrylate, ethyl acrylate, propyl acrylate, butyl acrylate, hexyl acrylate, 2-ethylhexyl acrylate, octyl acrylate, isooctyl acrylate, lauryl acrylate, stearyl acrylate, dimethylaminoethyl acrylate, diethylaminoethyl acrylate, 2-hydroxyethyl acrylate and the like; and methacrylate esters such as methyl methacrylate, ethyl methacrylate, propyl methacrylate, butyl methacrylate, hexyl methacrylate, 2-ethylhexyl methacrylate, octyl methacrylate, isooctyl methacrylate, lauryl methacrylate, stearyl methacrylate, dimethylaminoethyl methacrylate, diethylaminoethyl methacrylate, 2-hydroxyethyl methacrylate and the like.

Other examples of unsaturated monomers usable as comonomers, apart from the acrylic esters mentioned above, are styrene, α-methylstyrene, vinyl acetate, vinyl propionate, acrylamide, methacrylamide, N-methylolacrylamide, N-methylolmethacrylamide, acrylonitrile, methacrylamide, methacrylonitrile and the like.

As to the solvent used at the polymerization for preparation of the acrylic amino polymer, specific examples include lower alcohols such as methanol, ethanol, isopropanol and the like; glycols such as ethylene glycol, propylene glycol, diethylene glycol and the like; glycol ethers such as ethylene glycol monobutyl ether, diethylene glycol monoethyl ether, propylene glycol mono methyl ether, 3-methyl-3-methoxybutanol and the like; ketones such as acetone, methyl ethyl ketone and the like; aromatic hydrocarbons; and acetic esters such as ethyl acetate, butyl acetate and the like. Of these solvents, glycol ethers are preferred.

Examples of the alkylene imine compound used for introduction of the amino radical include ethylene imine, propylene imine, 1-butylene imine and 2-butylene imine. Of these alkylene imine compounds, ethylene imine and propylene imine are especially suitable. In the aminoalkyl side chain of the acrylic amino polymer, the reaction degree of the alkylene imine is preferably regulated so as to set the repeating unit number n to a range of 1 to 4. Alternatively, N-(aminoalkyl)-substituted alkylene imine such as N-(2-aminoethyl)aziridine, N-(3-aminopropyl)aziridine, N-(2-aminopropyl)aziridine and the like can be used in place of the alkylene imine in preparation of acrylic amino polymer.

In the present invention, the acrylic amino polymer is preferably put into solution. This approach may be directly used as a gelling liquid (B). However, since the gelling agent in use must be combined with the aqueous emulsion liquid (A), it is desired that the gelling liquid (B) be such that uniform mixture with the aqueous emulsion liquid (A) is achieved when the gelling liquid (B) contacts the aqueous emulsion liquid (A). One mode of accomplishing this is to dissolve the acrylic amino polymer in a hydrophilic solvent to form the gelling liquid (B). In another mode, it is also possible to select one of the highly water-soluble acrylic amino polymers from those mentioned before. In connection with the second mode, there is the noticeable property that, if the amino radical of the acrylic amino polymer is converted into the form of a salt with an acid, in particular, a water-soluble acid, the water solubility of the acrylic amino polymer is improved so that the acrylic amino polymer can be easily and uniformly dissolved in an aqueous medium. Namely, if an acrylic amino polymer in which the amino radical makes a salt with a water-soluble acid, water or an aqueous medium can easily be used as a solvent for the gelling liquid (B). Therefore, the second mode is also suited for solving the problems caused by the use of an organic solvent. The preferred examples of water-soluble acids that can be used for salt formation are, for example, mineral acids such as hydrochloric acid, hydrobromic acid, nitric acid, sulfuric acid and the like; carboxylic acids such as acetic acid, propionic acid and the like; and oxycarboxylic acids such as lactic acid, tartaric acid, and the like.

In practical operation, it is easier to perform the salt formation of the acrylic amino polymer by using a water solution of the water-soluble acid compound described above. Therefore, during the solution polymerization for synthesizing the acrylic amino polymer and the reaction for introducing the amino radical, if the solvent used is a hydrophilic solvent such as lower alcohols, glycols, glycol ethers, ketones and the like, the salt formation process can be carried out all at once. In particular, glycols and glycol ethers are preferable for obtaining suitable gel. However, in the case of using an organic solvent during reparation of the acrylic amino polymer, it is also possible to first remove the solvent from the reaction solution and then appropriately dilute the obtained acrylic amino polymer with water or a hydrophilic solvent before formation of the salt.

It is unnecessary in the present invention to severely restrict the amount of acid compound that forms a salt with the amino radical of the acrylic amino polymer. However, for achieving the above-described aim, it is preferred to fix the amount of the water-soluble acid compound so that the pH value of the gelling liquid (B) is within a range of about 2 to 7.

As an example of acrylic amino polymer salts available on the market, there are the polymer products sold by NIPPON SHOKUBAI CO., LTD of Chuo-ku, Osaka, JAPAN under the trade names of POLYMENT NK-100PM and POLYMENT NK-200PM.

There is another preparation process through which an acrylic copolymer containing an amino radical in the form of a secondary amine or tertiary amine in its molecule (hereafter referred to as "substituted amino acrylic polymer) can be prepared by copolymerizing an unsaturated monomer connected to a mono-substituted or di-substituted amino radical and a copolymerizable comonomer in an organic solvent. For the comonomer, various acrylate esters are usable. A mixture of a plural number of copolymerizable monomers can be used as well, if the mixture mainly contains an acrylate ester monomer. If the obtained copolymer is then treated with an acid material, a salt of the substituted amino acrylic copolymer can be provided. In regard to the acid material for the salt formation, the same acid compounds as those used for the preparation of the acrylic amino polymer described above may be similarly applied.

Examples of unsaturated monomers connected to a mono-substituted or di-substituted amino radical include 2-t-butylaminoethyl acrylate, 2-dimethylaminoethyl acrylate, 2-diethylaminoethyl acrylate, 3-dimethylamino-1-hydroxypropyl acrylate, 3-diethylamino-1-hydroxypropyl acrylate, N-2-dimethylaminoethyl acrylamide, N-2-diethylaminoethyl acrylamide, N-3-dimethylaminopropyl acrylamide, 2-t-butylaminoethyl methacrylate, 2-dimethylaminoethyl methacrylate, 2-diethylaminoethyl methacrylate, 3-dimethylamino-1-hydroxypropyl methacrylate, 3-diethylamino-1-hydroxypropyl methacrylate, N-2-dimethylaminoethyl methacrylamide, N-2-diethylaminoethyl methacrylamide, N-3-dimethylaminopropyl methacrylamide and the like.

For examples of a comonomer copolymerizable with the unsaturated monomer connected to a mono- or di-substituted amino radical, the same comonomers as those described in the preparation of the acrylic amino polymer can be similarly utilized. The amount of the unsaturated monomer connected to a mono- or di-substituted amino radical is preferably set to be greater than or equal to about 1/99 parts by weight relative to the copolymerizable comonomer.

In regard to the solvent to be used at the monopolymerization or copolymerization for preparing the substituted amino acrylic polymer, and the acid compound to be used for forming the salt of the mono- or di-substituted amino radical, the same solvent and the same acid compound as described in the preparation and the salt formation of the acrylic amino polymer can be similarly utilized.

According to the present invention, the amino-radical-containing acrylic copolymer (gelling agent) is provided in the gelling liquid (B) in the form of a solution with a hydrophilic medium and is preferably utilized as one part of the two-part emulsion adhesive, as stated in the description of the acryl amine polymer. For the hydrophilic medium, water, hydrophilic solvents and water-containing hydrophilic solvents can be utilized. Examples of hydrophilic solvents include lower alcohols such as methanol, ethanol, n-propanol, isopropanol, n-butanol, isobutanol, t-butanol and the like; glycols such as ethylene glycol, propylene glycol, diethylene glycol and the like; glycol ethers such as ethylene glycol monomethyl ether, diethylene glycol monoethyl ether, propylene glycol monomethyl ether, 3-methyl-3-methoxybutanol and the like; and ketones such as acetone, methyl ethyl ketone and the like. Of these solvents, glycols, glycol ethers and water are especially suitable. For the hydrophilic medium of the gelling liquid (B), one or a mixture of more than one solvent can be preferably utilized.

The amount of gelling agent in the gelling liquid (B) is preferably set within a range of about 2 to 80% by weight, and more preferably within a range of about 5 to 60% by weight, in view of the gelling power of the gelling agent and the viscosity of the gelling liquid (B). If the amount of gelling agent is insufficient, the adhesive becomes difficult to gel. On the other hand, if there is too much gelling agent, the viscosity of the gelling liquid (B) becomes so high that application becomes troublesome.

The two-part emulsion adhesive comprising the aqueous emulsion liquid (A) and the gelling liquid (B) according to the present invention is applicable for inorganic materials such as gypsum board, calcium silicate board, slate board and the like; plastic materials such as polystyrene foam, polyethylene foam and the like. In addition, the two-part emulsion adhesive of the present invention can also be applied for the adhesion of materials such as urethane foam, glass-wool bodies, glass matting, felt, cloth and the like, which are difficult to bond with conventional aqueous adhesives.

When using of the two-part emulsion adhesive according to the present invention, any known conventional mode of applying adhesives is applicable. For example, in one mode the emulsion adhesive liquid (A) and the gelling liquid (B) are sprayed at the same time so that the sprayed liquids (A)

and (B) mix with each other in the atmosphere before being blown onto an adherend surface. The sprayed adherend surface is then pressed to another adherend surface for adhesion thereto. In another exemplary mode, the emulsion liquid (A) and the gelling liquid (B) are separately applied to respective adherend surfaces, and then the adherend surfaces are pressed together. For the first mode, various conventional air sprayguns and airless sprayguns are applicable. For the second mode, the application device can be appropriately selected from ordinary devices such as a brush, a roll coater and the like.

The mixing ratio of the emulsion liquid (A) and the gelling liquid (B) can be widely changed in accordance with nonvolatile contents of the liquids (A) and (B), and it is preferable to set the mixing ratio so that the ratio of the polymer component contained in the gelling liquid (B) relative to the polymer component in the emulsion liquid (A) is within a range of about 0.01 to 10, more preferably, about 0.02 to 5. The amount dispensed is preferably regulated so that the total amount of the polymer components of the emulsion liquid (A) and the gelling liquid (B) is within a range of approximately 10 to 500 g/m$^2$.

The two-part adhesive prepared in accordance with the above-described construction causes insolubilization in the gelling liquid (B) at the gelation reaction and becomes a gel having high tackiness. It should be noted that the insolubilization caused in the gelling liquid (B) is affected by various factors. For example, insolubilization may be caused by a change in action of the anion radical of the emulsion liquid (A), a change in concentration of each component in the gelling liquid (B), a change in mixing ratio in a case of using a mixed solvent, a change in pH value of the gelling liquid (B), mechanical shocks and the like. Therefore, it is desired to appropriately regulate or modify the composition ratios, pH values, application amounts, etc., of the emulsion liquid (A) and the gelling liquid (B), in accordance with the kinds and combination of the emulsion material in liquid (A) and the gelling agent.

The two-part adhesive according to the present invention is prepared as described above and employs an amino-radical-containing acrylic copolymer as a gelling agent. In accordance with this construction, the gelling and hardening speed of the combined two-part adhesive is appropriately reduced, so that the wetting ability of the gelled adhesive can be preserved for a relatively long time at the initial state of gelation. As a result, the layer of gelled adhesive can quickly be adapted to fit on rough adherend surfaces. As a result, the initial bond strength of the gelled adhesive develops quickly and increases rapidly. Moreover, the gelled adhesive has a high stickiness, so it can be adapted for bonding foam materials and the like despite the elasticity of those materials. Furthermore, since the gelled adhesive scarcely discharges any sort of water medium, it is possible to bond hydrophobic materials like plastics.

Referring now to the results of experiments, the preferred embodiments of the two-part adhesive according to the present invention will be described.

EXAMPLE

Two-part adhesives of Sample Nos. 1 to 13 were prepared in accordance with the description below, and each of the obtained adhesives was evaluated by being subjected to adhesion tests. Here, it is to be noted that all percentages and parts in the examples and comparative examples are by weight unless otherwise specified.

Sample No. 1

Placed in a reactor were 2 parts of ADEKAREASOAP SE-10N (reactive anionic surfactant [$C_9H_{19}$—Ph—O—$CH_2CH(CH_2OCH_2CH=CH_2)$—$(OCH_2CH_2)_n$—$OSO_3NH_4$] sold by ASAHI DENKA KOGYO K. K. of Chuo-ku, Tokyo, Japan), 1 part of HITENOL N-08 (anionic surfactant sold by DAI-ICHI KOGYO SEIYAKU CO., LTD. of Shimogyo-ku, Kyoto, Japan), 4 parts of 3-methyl-3-methoxybuthanol, 0.3 parts of potassium persulfate and 42.7 parts of deionized water. Next, the reactor was heated so that the temperature inside the reactor was raised to 70° C., and then 40 parts of 2-ethylhexyl acrylate, 8 parts of methyl methacrylate and 2 parts of acrylic acid were added to the reactor for 90 minutes. Next, the mixture in the reactor was heated at 75° C. for three hours to achieve an emulsion polymerization reaction, thereby obtaining an emulsion liquid comprised of an acrylate ester polymer containing an anion radical. The emulsion liquid contained 52% nonvolatile matter, and the viscosity of the emulsion liquid was measured at 4,000 mPa.s.

In a separate step, 50 parts of a water solution having an acrylate ester copolymer containing an amino radical in the form of an amine salt with hydrochloric acid (sold under the trade name "POLYMENT NK-100PM by NIPPON SYOKUBAI CO., LTD. of Chuo-ku, Osaka, Japan, nonvolatile matter: 49%, amine hydrogen equivalent weight; 370 g. soild/eq, amino radical content calculated by using the value of amine hydrogen equivalent weight: $16 \times 10^{-4}$ to $20 \times 10^{-4}$ mol/g) was diluted with 50 parts of water to obtain a dilute solution comprised of an amino-radical-containing acrylate ester copolymer.

By using the above-obtained emulsion liquid of acrylate ester polymer as the aqueous emulsion liquid (A) and the dilute solution of amino-radical-containing acrylate ester copolymer as the gelling liquid (B), an adhesion test, described in detail below, was performed. The result of the test is shown in Table 1.

Sample No. 2

Placed in a reactor were 2 parts of HYPERMER A-409 (polymer type nonionic surfactant sold by ICI CHEMICALS AND POLYMERS LIMITED), 2 parts of sodium dodecylbenzenesulfonate, 1 part of sodium p-styrenesulfonate, 3 parts of 3-methyl-3-methoxybutanol, 0.3 parts of potassium persulfate and 41.7 parts of deionized water. Next, the reactor was heated so that the temperature inside the reactor was raised to 70° C., and then 40 parts of 2-ethylhexyl acrylate, 8 parts of methyl methacrylate and 2 parts of acrylic acid were added to the reactor for 90 minutes. Next, the mixture in the reactor was heated at 75° C. for three hours to achieve an emulsion polymerization reaction, thereby obtaining an emulsion liquid comprised of an acrylate ester polymer containing an anion radical. The emulsion liquid contained 54% nonvolatile matter, and the viscosity of the emulsion liquid was measured at 3,000 mPa.s.

The adhesion test was similarly performed by using the above-obtained emulsion liquid of acrylate ester polymer as the aqueous emulsion liquid (A) and the same dilute solution of amino-radical-containing acrylate ester copolymer of Sample No. 1 as the gelling liquid (B). The result of the test is shown in Table 1.

Sample No. 3

Placed in a reactor were 20 parts of butyl acrylate, 15 parts of methyl methacrylate, 5 parts of styrene, 10 parts of dimethylaminoethyl acrylate, 1.5 parts of azobisisobutyronitrile and 50 parts of 3-methyl-3-methoxybutanol. Next, the reactor was heated at 85° C. for ten hours to carry out a solution polymerization reaction. The reactant was then cooled and mixed with 5.5 parts of 35% hydrochloric acid water solution. The aqueous solution was then further diluted with 100 parts of water to obtain a solution comprised of a di-substituted amino-radical-containing acrylic ester copolymer. The copolymer solution contained 25% nonvolatile matter, and the viscosity of the solution was measured at 1,000 mPa.s.

By using the emulsion liquid of acrylate ester polymer of Sample No. 1 as the aqueous emulsion liquid (A) and the above-obtained solution of amino-radical-containing acrylic ester copolymer as the gelling liquid (B), the adhesion test was similarly performed. The result of the test is shown in Table 1.

Sample No. 4

Placed in a reactor were 20 parts of butyl acrylate, 15 parts of methyl methacrylate, 5 parts of styrene, 10 parts of dimethylaminoethyl acrylate, 1.5 parts of azobisisobutyronitrile and 50 parts of 3-methyl-3-methoxybutanol. The reactor was then heated at 85° C. for ten hours to carry out a solution polymerization. The reactant was cooled once and mixed with 3 parts of acetic acid. The mixture was then diluted with 120 parts of water to obtain a water solution comprised of an acrylic ester copolymer containing di-substituted amino radical. The solution contained 23% nonvolatile matter, and the viscosity of the emulsion liquid was measured at 1,200 mPa.s.

By using the emulsion liquid of Sample No. 1 as the aqueous emulsion liquid (A) and the above-obtained solution of amino-radical-containing acrylic ester copolymer as the gelling liquid (B), the adhesion test was similarly performed. The result of the test is shown in Table 1.

Sample No. 5

The adhesion test was similarly performed by using an emulsion liquid comprised of a styrene-butadiene copolymer containing an anionic surfactant (sodium salt of fatty acid, sold under the trade name of 2108 by JAPAN SYNTHETIC RUBBER Co., LTD., Chuo-ku, Tokyo, Japan, nonvolatile content: 40%, viscosity: 50 mPa.s) as the aqueous emulsion liquid (A) and the same dilute solution of amino-radical-containing acrylate ester copolymer of Sample No. 1 as the gelling liquid (B). The result of the test is shown in Table 1.

Sample No. 6

Placed in a reactor were 20 parts of butyl acrylate, 15 parts of methyl methacrylate, 5 parts of styrene, 10 parts of dimethylaminoethyl acrylate, 1.5 parts of azobisisobutyronitrile and 50 parts of 3-methyl-3-methoxybutanol. Next, the reactor was heated at 85° C. for ten hours to carry out a solution polymerization. The reactant was then cooled and diluted with 65 parts of propylene glycol monomethyl ether to obtain an aqueous solution comprised of an acrylic ester copolymer containing di-substituted amino radical. The solution contained 30% nonvolatile matter, and the viscosity of the emulsion liquid was measured at 800 mPa.s.

By using the emulsion liquid of acrylate ester polymer of Sample No. 2 as the aqueous emulsion liquid (A) and the above-obtained solution of amino-radical-containing acrylic ester copolymer as the gelling liquid (B), the adhesion test was performed. The result of the test is shown in Table 1.

Sample No. 7

The adhesion test was similarly performed using the emulsion liquid of acrylate ester polymer of Sample No. 1 as the aqueous emulsion liquid (A), without using a gelling liquid (B). The result of the test is shown in Table 1.

Sample No. 8

Placed in a reactor were 2 parts of EPAN 750 (nonionic surfactant sold by DAI-ICHI KOGYO SEIYAKU CO., LTD.), 1 part of EMULGEN 930 (nonionic surfactant sold by KAO CORP. of Chuo-ku, Tokyo, Japan), 0.3 parts of potassium persulfate and 46.7 parts of deionized water. Next, the reactor was heated so that the temperature inside the reactor was raised to 70° C., and then 43 parts of 2-ethylhexyl acrylate and 7 parts of methyl methacrylate were added to the reactor for 90 minutes. Next, the mixture in the reactor was heated at a temperature of 70 to 75° C. for three hours to carry out an emulsion polymerization reaction, thereby obtaining an emulsion liquid comprised of an acrylate ester polymer hardly containing anion radical. The emulsion liquid contained 50% nonvolatile matter, and the viscosity of the emulsion liquid was measured at 4,000 mPa.s.

By using the above-obtained emulsion liquid of acrylate ester polymer not containing an anion radical as the aqueous emulsion liquid (A) and the solution of amino-radical-containing acrylic ester copolymer of Sample No. 1 as the gelling liquid (B), the adhesion test was similarly performed. The result of the test is shown in Table 1.

Sample No. 9

A solution of ethylene imine polymer containing amino radicals in the forms of primary, secondary and tertiary amine was prepared by diluting 50 parts of EPOMIN SP-200 (trade name of ethylene imine polymer sold by NIPPON SHOKUBAI CO., LTD., resin content: 98%) in 120 parts of water.

By using the emulsion liquid of acrylate ester polymer of Sample No. 1 as the aqueous emulsion liquid (A) and the above-obtained polymer solution as the gelling liquid (B), the adhesion test was similarly performed. The result of the test is shown in Table 1.

Sample No. 10

A solution of a salt of stearylamine with hydrochloric acid, which contains the amino radical in the form of primary amine hydrochloride was prepared by diluting 50 parts of FARMIN R86H (trade name of stearylamine hydrochloride, sold by KAO CORP., active ingredient: 98%) in 50 parts of water.

The adhesion test was similarly performed using of the emulsion liquid of acrylate ester polymer of Sample No. 1 as the aqueous emulsion liquid (A) and the above-obtained solution of stearylamine hydrochloride as a gelling liquid (B). The result of the test is shown in Table 1.

Sample No. 11

The adhesion test was similarly performed using the emulsion liquid of acrylate ester polymer of Sample No. 1 as the aqueous emulsion liquid (A) and an emulsion liquid of amino-radical-containing acrylic ester copolymer (nonvolatile content: 40%, sold under the trade name of POLYMENT KX-CK200 by NIPPON SHOKUBAI CO., LTD.) as the gelling liquid (B). The result of the test is shown in Table 1.

Sample No. 12

In an ammonia gas atmosphere, 100 parts of an isobutylene-maleic anhydride copolymer (sold under the trade name "ISOBAN 04" by KURARAY ISOPRENE K.K. of Kita-ku, Osaka, Japan) was heated to 180° C. to obtain an isobutylene-maleic imide-maleic anhydride copolymer. Then placed in a reactor were 40 parts of the isobutylene-maleic imide-maleic anhydride copolymer, 7 parts of 25% ammonia water and 160 parts of water. The mixture in the reactor was heated at 85° C. for 2 hours, thereby obtaining an aqueous solution of isobutylene-maleic imide-maleic anhydride copolymer. The aqueous solution contained 20% nonvolatile matter, and the viscosity of the aqueous solution was measured at 6,000 mPa.s.

By using the same emulsion liquid of acrylate ester polymer of Sample No. 1 as the aqueous emulsion liquid (A) and the above-obtained aqueous solution of isobutylene-maleic imide-maleic anhydride copolymer as the gelling liquid (B), the adhesion test was similarly performed. The result of the test is shown in Table 1.

Sample No. 13

Dissolved were 10 parts of aluminum sulfate $[Al_2(SO_4)_3 \cdot 18H_2O]$ into 90 parts of water to obtain an aqueous solution of aluminum sulfate.

By using anionic type acrylate ester copolymer emulsion (sold under the trade name "Penguin Bond No. 1230 by Sunstar Chemical Industry Co.,) as the aqueous emulsion liquid (A) and the above-obtained aqueous solution of aluminum sulfate as the gelling liquid (B) at a ratio of (A)/(B)=100/2, the adhesion test was similarly performed, excepting that the application amount of the emulsion liquid (A) was 29.4 $g/cm^2$, and that of the gelling liquid (B) was 0.6 $g/cm^2$. The result of the test is shown in Table 1.

Adhesion Test

Adhesion Tests were performed for Sample Nos. 1 to 13 at an atmospheric temperature of 20° C. with 65% relative humidity in accordance with the following procedure.

First, a glass mat having a dimension of 5 mm×300 mm×300 mm and a density of 32 $kg/m^3$ and a glass cloth having a dimension of 0.18 mm×350 mm×350 mm were prepared. With a pair of sprayguns, the emulsion liquid (A) and the gelling liquid (B) were separately sprayed at the same time so that the sprayed liquids (A) and (B) became mixed with each other in the atmosphere and were uniformly blown onto the glass mat. At this time, the applied amount of liquid (A) was 32 $g/m^2$, and that of liquid (B) was 8 $g/m^2$. Then, the glass cloth was at once manually pressed onto the adhesive-applied glass mat by hand in order to bond the glass mat and the glass cloth together.

After pressing, the adhered glass mat and glass cloth were horizontally disposed in such a way that the glass cloth was located at the lower side, with the glass mat being fixed at the upper side. The condition of the glass cloth was observed for one minute, and evaluation of the adhesive w as performed as follows:

A: The glass cloth was not released during the observation.

B: The glass cloth had been retained on the glass mat, but a portion of the glass cloth was separated.

C: The glass cloth fell off the glass mat.

TABLE 1

| Sample No. | 1 | 2 | 3 | 4 | 5 | 6 | 7 | 8 | 9 | 10 | 11 | 12 | 13 |
|---|---|---|---|---|---|---|---|---|---|---|---|---|---|
| evaluation | A | A | A | A | B | B | C | C | C | C | C | C | C |

The obtained gel in each of Sample Nos. 1 to 6 was sticky like birdlime, respectively. From these results, it can be seen that the amino-radical-containing acrylic copolymer effectively works to impart adhesive properties to the gel, though it is a little changed by the condition of the amino radical.

In contrast, the gel of each of Sample Nos. 8 and 9 was not so sticky and was crumbly like lees of bean-curd, and the gel of each of Sample Nos. 7, 10 and 11 did not gel. From these result, the following can be demonstrated.

1) In comparison of Sample No. 1 with Sample Nos. 9 and 10, it is effective for adhesive properties exhibited on the gel that the main body of the gelling agent is an acrylic copolymer.

2) In comparison of Sample No. 1 with Sample No. 8, interaction between the anion radical of the emulsion liquid (A) and the amino radical of the gelling liquid (B) may be related to operation of the two-part adhesive during gelation. Moreover, it is desired for obtaining gel having suitable stickiness to introduce a sufficient amount of anion radical into the components of the emulsion liquid (A).

3) In comparison of Sample No. 1 with Sample No. 11, it is important for tackiness of the gel that the gelling liquid (B) gives rise to insolubilization at the time of gelation.

Moreover, as is clear from the above results, the two-part adhesive according to the present invention achieves a suitable initial bond strength in adhesive bonding of glass materials. Therefore, the adhesive of the present invention can easily be used to bond other plastics and foam materials with rough surfaces, which cannot be bonded sufficiently with conventional aqueous adhesives.

Probe Tack Test

The following probe tack tests No. 1 and No. 2 were performed for Sample No. 1 and No. 13 at an atmospheric temperature of 20° C. with 65% relative humidity in accordance with the following procedure, using a tack tester with a cylindrical probe having a diameter of 12 mm.

(Probe Tack Test No. 1)

First, a glass mat having a dimension of 5 mm×300 mm×300 mm and a density of 32 $kg/m^3$ and a circular glass cloth having a diameter of 12 mm and thickness of 0.18 mm were prepared. The glass mat was laid on a flat table and fixed thereto, and the glass cloth was fixed to the circular tip end of the probe of the tack tester.

In each sample, with a pair of sprayguns, the liquid (A) and the gelling liquid (B) were separately sprayed at the same time so that the sprayed liquids (A) and (B) became mixed with each other in the atmosphere and were uniformly blown onto the glass mat on the table. At this time, the applied amount of the liquid (A) of each sample was 24 $g/m^2$ (Sample No. 1) and 29.4 $g/m^2$ (Sample No. 13), and that of the liquid (B) was 6 $g/m^2$ (Sample No. 1) and 0.6 $g/m^2$ (Sample No. 13). Then, moving the probe perpendicularly to the glass mat at a speed of 10 mm/s, the glass cloth on the tip of the probe was at once contacted to the adhesive-applied glass mat and pressed to the glass mat at a contact pressure of 0.98 $N/cm^2$ for 5 seconds in order to bond the glass mat and the glass cloth together. After the pressing, the probe was perpendicularly pulled off the glass mat at a moving speed of 10 mm/s to release the probe from the glass mat. At this time, the pulling force which was necessary for separation of the glass cloth from the glass mat was measured.

The above operation was repeated, excepting that, before the contacting the glass cloth with the glass mat, the adhesive was left to stand for 60 seconds.

The results of the above measurements are shown in Table 2.

(Probe Tack Test No. 2)

The operation of the probe tack test No. 1 was repeated, excepting that each of the glass mat and the glass cloth was changed to canvas (No. 9 of Japanese standards), respectively. The results of the measurements are shown in Table 3.

TABLE 2

| Sample | Pulling Force (N/cm²) Open Time | |
|---|---|---|
| No. | 0 sec. | 60 sec. |
| 1 | 1.9 | 1.9 |
| 13 | 0.12 | 0.14 |

TABLE 3

| Sample | Pulling Force (N/cm²) Open Time | |
|---|---|---|
| No. | 0 sec. | 60 sec. |
| 1 | 4.4 | 4.9 |
| 13 | 0.5 | 0.9 |

During the probe test No. 1, the glass mat with the two-part adhesion of Sample No. 1 in each of the cases of the open time being 0 sec. and 60 sec. was broken by releasing the probe, respectively.

As clearly understood from the above results, the two-part type adhesive of Sample No. 1 of the present invention tightly bonds the glass mat and the glass cloth. In comparison, the bonding of the adhesive of Sample No. 13 which is a conventional adhesive is quite weak in every case of the tests. The above difference is considered to be produced from tackiness which the adhesive exhibits. Therefore, it is clear that the two-part type adhesive of the present invention is quite useful and effective, especially for bonding permeable or porous materials such as glass matting, glass cloth, canvas, metal netting, plastic foam and the like, and it is well above the conventional level.

Finally, it must be understood that the invention is in no way limited to the above embodiments and that many modifications may be made to the above embodiments without departing from the scope of the invention as defined by the appended claims.

What is claimed is:

1. A two-part adhesive comprising:
   (A) an aqueous emulsion liquid comprising polymer components and emulsifier components, wherein at least one of the polymer components and the emulsifier components contain an anion radical, the amount of the polymer components in the aqueous emulsion liquid is within a range from about 20% to about 80% by weight and the amount of the emulsifier components is within a range from about 0.1% to about 20% by weight relative to the amount of the polymer components; and
   (B) a solution having an amino-radical-containing acrylic copolymer at a content of about 2 to 80% by weight with a pH value of about 2 to about 7;
   wherein in combination said aqueous emulsion liquid (A) and said solution (B) immediately form a gel adhesive.

2. The two-part adhesive of claim 1, wherein the anion radical of the aqueous emulsion liquid (A) includes at least one anion selected from the group consisting of a carboxyl radical, a sulfo radical, a hydroxysulfonyl oxy radical, a dihydroxy phosphoryloxy radical and their respective salts with base compounds.

3. The two-part adhesive of claim 1, wherein the anion radical of the aqueous emulsion liquid (A) is contained in at least one of the emulsifier components.

4. The two-part adhesive of claim 3, wherein at least one of the emulsifiers includes one selected from the group consisting of salts of fatty acids, salts of monoalkyl hydrogen sulfates, salts of alkyl sulfonic acids, salts of alkylbenzenesulfonic acids, salts of alkylnaphthalenesulfonic acids, salts of dialkyl hydrogen sulfosuccinates, salts of alkyldiphenyletherdisulfonic acids, salts of alkyl dihydrogen phosphates, salts of dialkyl hydrogen phosphates, salts of polyoxyethylene alkyl ether sulfonic acids and salts of polyoxyethylene alkylphenol ether sulfonic acids.

5. The two-part adhesive of claim 3, wherein the emulsifiers includes an anionic surfactant containing a double bond.

6. The two-part adhesive of claim 1, wherein the anion radical of the aqueous emulsion liquid (A) is contained in at least one of the polymer components.

7. The two-part adhesive of claim 6, wherein the anion radical includes one selected from the group consisting of a carboxyl radical and a sulfo radical.

8. The two-part adhesive of claim 7, wherein at least one of the polymer components contain a repeating moiety selected from the group consisting of an acrylic acid moiety, a methacrylic acid moiety, an itaconic acid moiety, a maleic acid moiety, a fumaric acid moiety, a styrenesulfonic acid moiety, an allylsulfonic acid moiety, a sulfopropyl acrylate moiety, a 2-methacryloyloxynaphtalene-2-sulfonic acid moiety, a 2-acryloyloxybenzenesulfonic acid moiety, and their neutralized salts by a base compound.

9. The two-part adhesive of claim 8, wherein at least one of the polymer components contain an epoxy-containing repeating moiety.

10. The two-part adhesive of claim 9, wherein the epoxy-containing repeating moiety is selected from the group consisting of a glycidyl acrylate moiety and a glycidyl methacrylate moiety.

11. The two-part adhesive of claim 1, wherein the polymer component contains at least one component selected from the group consisting of an acrylic copolymer, a styrene-butadiene copolymer and a chloroprene copolymer.

12. The two-part adhesive of claim 1, wherein the aqueous emulsion liquid further contains an epoxy resin intermolecularly having two or more epoxy radicals.

13. The two-part adhesive of claim 12, wherein the epoxy resin is selected from the group consisting of bisphenol A diglycidil ether and bisphenol F diglycidil ether.

14. The two-part adhesive of claim 1, wherein the aqueous emulsion liquid (A) contains water and a glycol ether.

15. The two-part adhesive of claim 1, wherein the solution (B) contains an acid compound in an amount sufficient to neutralize at least one of the amino radicals which are part of the amino-radical-containing acrylic copolymer.

16. The two-part adhesive of claim 1, wherein the anion radical includes anion radicals selected from the group consisting of hydroxysulfonyloxy radical and its salts, and the anion radical is introduced by a polymerization catalyst selected from the group consisting of potassium persulfate and ammonium persulfate.

17. The two-part adhesive of claim 1, wherein the content of the amino radical contained in the amino-radical-containing acrylic copolymer is within a range of approximately $2 \times 10^{-4}$ to $60 \times 10^{-4}$ mol/g.

18. The two-part adhesive of claim 1, wherein the content of the amino radical contained in the amino-radical-containing acrylic copolymer is within a range of approximately $5 \times 10^{-4}$ to $40 \times 10^{-4}$ mol/g.

19. The two-part adhesive of claim 1, wherein the solution (B) contains a hydrophilic solvent which is selected from the group consisting of water, water-soluble solvents and mixtures of water and the water-soluble solvents.

20. The two-part adhesive of claim 19, wherein the hydrophilic solvent is selected from the group consisting of alcohols, ketones, glycols and glycol ethers.

21. The two-part gel adhesive of claim 1, wherein said solution (B) is insolubilized when said aqueous emulsion liquid (A) and said solution (B) are combined.

22. The two-part adhesive of claim 1, wherein the solution (B) is an aqueous solution.

23. A gel adhesive produced by contacting the aqueous emulsion liquid (A) and the solution (B) of claim 1 with each other.

24. The two-part adhesive of claim 1, wherein the amount of the polymer component in the aqueous emulsion liquid is within a range from about 40% to about 70% by weight.

25. The two-part adhesive of claim 1, wherein the ratio of the amount of the aqueous emulsion liquid (A) to the amount of the solution (B) is within a range from about 0.01 to about 10 by weight.

26. The two-part adhesive of claim 1, wherein the amino radical is exclusive of an amido radical and an imido radical, and the content of the amino radical in the amino-radical-containing acrylic copolymer is within a range of about $2 \times 10^{-4}$ mol/g to about $60 \times 10^{-4}$ mol/g.

* * * * *